United States Patent [19]

Bunger

[11] 4,424,129

[45] Jan. 3, 1984

[54] DEWATERING APPARATUS FOR WASTE RECOVERY SYSTEMS

[76] Inventor: Richard E. Bunger, 5202 E. Washington St., Phoenix, Ariz. 85034

[21] Appl. No.: 392,551

[22] Filed: Jun. 28, 1982

[51] Int. Cl.³ ..................... B01D 35/20; B01D 21/14
[52] U.S. Cl. .................................. 210/388; 210/415; 210/523; 209/278; 209/390
[58] Field of Search .............. 210/159, 163, 208, 407, 210/413, 415, 523, 528, 384, 388; 209/278, 390

[56] References Cited

U.S. PATENT DOCUMENTS

| | | | |
|---|---|---|---|
| 1,807,387 | 8/1932 | Shimmin | 210/407 |
| 2,181,404 | 11/1939 | Koppitz et al. | 210/415 |
| 2,312,764 | 3/1943 | Lubke | 210/415 |
| 2,547,577 | 4/1951 | Hamacher et al. | 210/415 |
| 4,002,559 | 1/1977 | Paterson et al. | 210/415 |
| 4,330,413 | 5/1982 | Wilson | 210/388 |

FOREIGN PATENT DOCUMENTS

| | | | |
|---|---|---|---|
| 149 | 7/1877 | Fed. Rep. of Germany | 210/407 |
| 1913192 | 1/1971 | Fed. Rep. of Germany | 210/407 |
| 5530 | 5/1906 | France | 210/415 |
| 2085745 | 5/1982 | United Kingdom | 210/388 |
| 207849 | 3/1968 | U.S.S.R. | 210/388 |
| 542529 | 2/1977 | U.S.S.R. | 210/388 |

Primary Examiner—Charles N. Hart
Assistant Examiner—John W. Czaja
Attorney, Agent, or Firm—Warren F. B. Lindsley

[57] ABSTRACT

An apparatus for collecting, transporting and dewatering animal waste prior to its introduction into a press for separating the solids therein from the remaining liquid waste.

1 Claim, 7 Drawing Figures

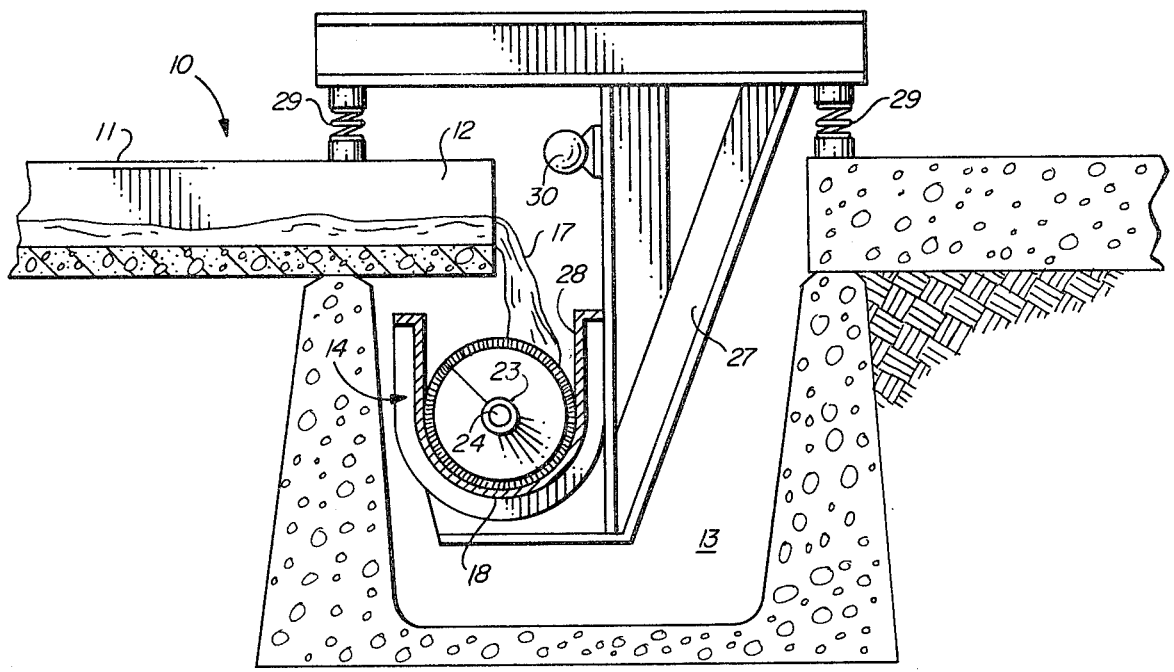
FIG-1
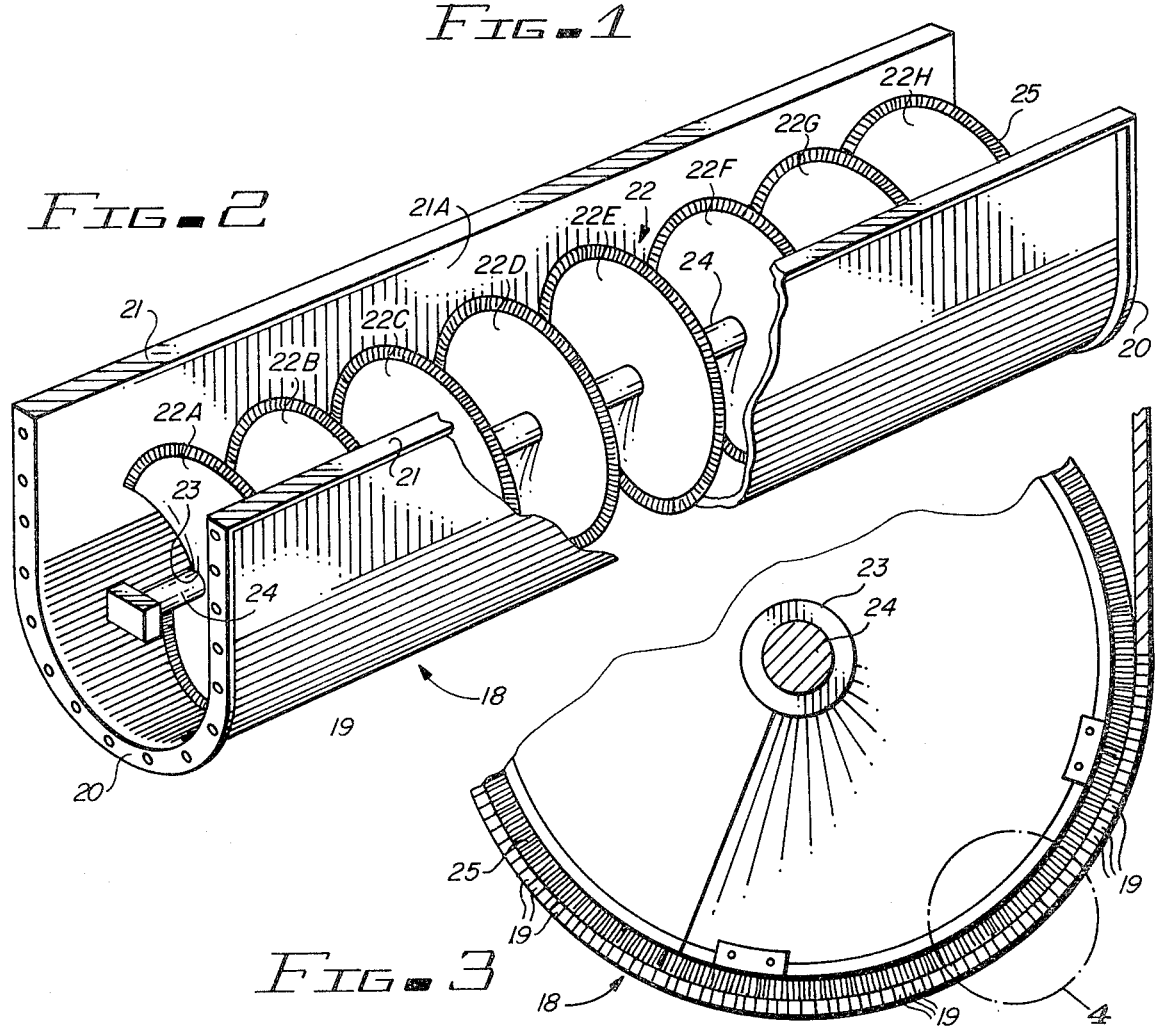
FIG-2
FIG-3

DEWATERING APPARATUS FOR WASTE RECOVERY SYSTEMS

BACKGROUND OF THE INVENTION

The use of commercial feedlots for fattening cattle has rapidly grown in popularity and now plays an important part in the cattle-fattening industry. Large numbers of cattle running to the thousands are brought to these lots where they are concentrated in relatively close quarters.

The problems associated with these feedlots now represent a major national concern. Odors produced by the lots have created serious problems, especially when the feedlots have been located near population centers. Waste materials carried into the soil by rainwater runoff threaten pollution of groundwater and pose a serious health hazard to the surrounding communities. The accumulation of manure at the feedlots is also a hazard to the health of the cattle because of air contamination and the attraction of flies and other insects.

Further, the amount of water needed in the fluid movement of animal excreta from the confinement pens and its later disposal is making this method of waste handling prohibitive.

DESCRIPTION OF THE PRIOR ART

Various scientific methods for the treatment of animal wastes are known, with U.S. Pat. No. 3,955,536 being one of the recent innovations which reclaims portions of the solid content of the waste for use as a nutritious and palatable feed supplement.

This patent also teaches the reclaiming of a portion of the liquid content of the animal waste for reuse in its waste processing system. There is no teaching in this patent of the use of a dewatering system prior to a pressing function to reclaim and reuse in a closed system a sufficient portion of the liquid content of the fluid waste accumulation system.

U.S. Pat. No. 3,982,483 discloses a moisture reduction press for separating the solid and liquid elements of animal waste.

None of these patents, individually or in combination, disclose the particular dewatering apparatus for a waste recovery system as set forth and claimed herein.

Although the health and environment problems of confinement pens provide a strong incentive for the development of improved waste handling means, another incentive for the development of improved waste handling systems involves the reclaiming of the unused protein content of the animal excreta as well as an important portion of the liquid used in the flushing system. It has been known for some time that beef cattle make relatively inefficient use of the food value present in their rations. Of the total protein content initially present in the feed, a large portion is passed through their systems undigested. The remainder is cast off and is still present in the manure. New processes are now being investigated for converting the manure into high quality cattle feed, thereby recovering the unused protein content and turning the waste problem into a potentially profitable opportunity.

SUMMARY OF THE INVENTION

In accordance with the invention claimed, one object of this invention is to provide an improved dewatering system for liquid/solid materials.

Another object of this invention is to provide a novel dewatering apparatus for use in conjunction with a feedlot waste accumulation system that reclaims and recirculates in a closed, equilibrium-balanced system a substantial portion of the liquid used in the waste accumulation system.

A further object of this invention is to provide apparatus for use in a waste processing system that collects, dewaters and transfers to a press a liquid reduced fibrous portion of the initially collected liquid suspended animal waste.

A still further object of this invention is to provide an improved waste recovery system for animal confinement pens which minimizes the water volume required to remove animal waste therefrom.

A still further object of this invention is to provide an improved waste dewatering apparatus for use with animal confinement pens which separates the solid and liquid elements of compressible materials to limit or control the amount of moisture retained in the relatively solid end product.

A still further object of this invention is to provide an improved process for removing waste from an animal confinement facility which minimizes fresh water requirements and concentrates nutrients and fertilizer components, thereby eliminating unnecessary dilution of the waste product.

A still further object of this invention is to provide an improved dewatering apparatus for simultaneously removing waste from the flumed platform of an animal confinement pen and transporting, with the aid of a novel rotatable auger confined in a cylindrical like screen, the dewatered waste to a press of a reclaiming system.

A still further object of this invention is to provide a waste processing system employing a recycling liquid function which greatly reduces the discharge liquid volume of the waste which must be handled and disposed of in an ecologically acceptable manner.

Other objects and advantages of the invention will become apparent from the following description when taken in connection with the accompanying drawings.

BRIEF DESCRIPTION OF THE DRAWINGS

The present invention may be more readily described by reference to the accompanying drawings in which:

FIG. 1 is a cross-sectional view of an improved waste processing system employing a novel transporting and dewatering apparatus;

FIG. 2 is a perspective view of the transporting and dewatering apparatus shown in FIG. 1;

FIG. 3 is an enlarged partial view of one of the flightings of the auger of the transporting and dewatering apparatus shown in FIG. 2;

DESCRIPTION OF THE PREFERRED EMBODIMENT

Figures 4, 5:
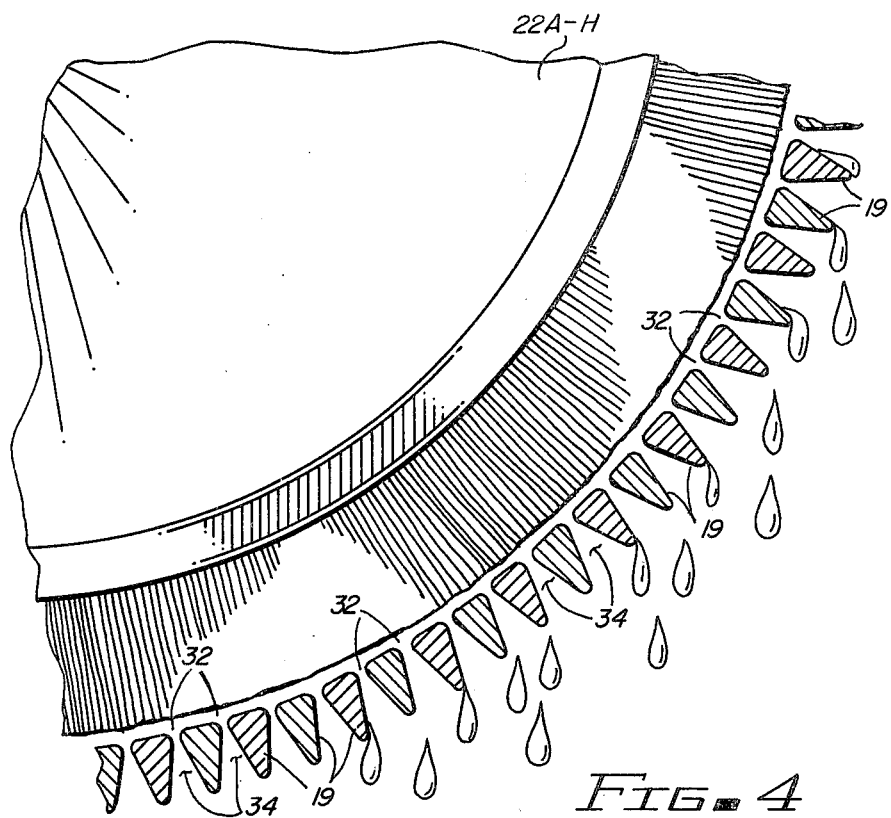
FIG. 4 is an enlargement of the circled area shown in FIG. 3.
FIG. 5 is an enlarged partial end view of one of the flightings of the auger shown in FIG. 2.

Referring more particularly to the drawings by characters of reference, FIG. 1 diagrammatically illustrates one embodiment of a waste processing system embodying the invention wherein a slotted floor or platform 10 is provided for supporting food animals such as cattle, pigs and the like either in or out of an enclosure. U.S. Pat. No. De. 255,947 discloses a platform employing a plurality of troughs, passageways or flumes formed to extend longitudinally thereof. Thus, platform 10 forms a floor 11 for an animal feedlot, confinement pen or building employing a plurality of flumes 12 extending longitudinally thereof.

When positioned on the ground to form a floor, one end of the platform is suitably elevated a predetermined amount to cause liquid 17 flowing through flumes 12 in the platform to move under gravity towards its other end.

Animals penned upon the slotted floor of a feedlot continuously move their feet or bodies over the top surface of the floor of the pen, and by their action, scrape their waste into flumes 12 positioned in platform 10 below the surface of floor 11.

Since the waste is continuously or periodically flushed from the flumes such as, for example, one or more times a day, the animal waste remains moist when it is moved into the cross drain pit or waste collection ditch 13. This drain is preferably below the level and across the ends of the plurality of discharge flumes 12 in platform 10, so that the waste from all of the flumes 12 of the platform may be easily moved into ditch 13. By continuously or periodically obtaining the fresh animal waste within a few hours after it is expelled from the livestock, the animal waste not only remains moist but also still retains a maximum amount of its valuable organic and inorganic nutrients such as protein, starches, sugars, fats, carbohydrates, phosphates, sulphur, potassium, etc. It is well known that biological degradation of the organic nutrients proceeds at a rapid rate, destroying useful and available nutrients. By use of the disclosed apparatus and method of operation, recovery of these nutrients is possible because of the rapid processing of waste in hours rather than days or months, as done in many existing feedlots.

Figures 6, 7:
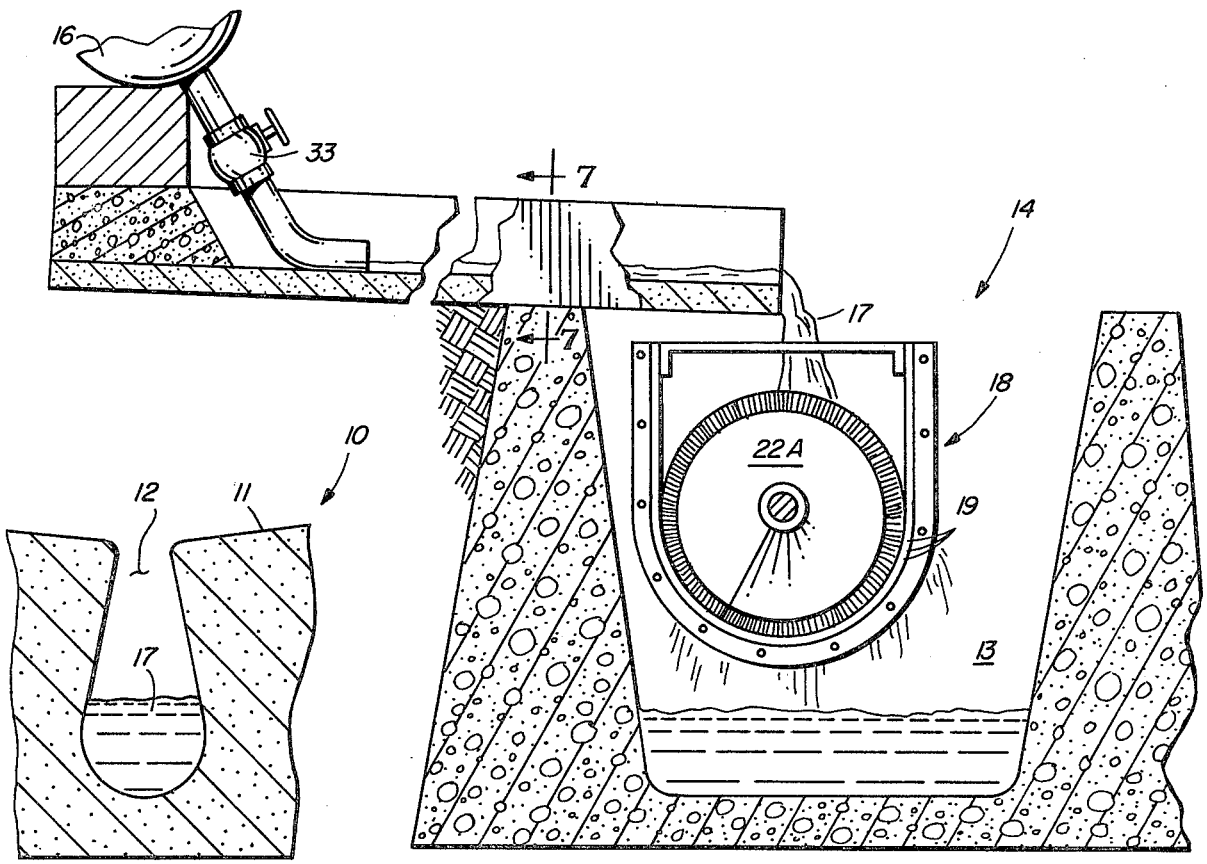
FIG. 6 is a modification of the waste processing system shown in FIG. 1 and showing a flush control system.
FIG. 7 is a cross-sectional view of FIG. 6 taken along the line 7—7.

The water added for the flushing action may be additional liquid to the system as needed and/or recycled effluent from a closed system. This additional liquid in the presence of vigorous agitation causes the microsize particles which are connected to the fibers in the animal waste to loosen, allowing them to pass through a screening and dewatering apparatus 14 forming a part of a waste processing system; an example of such a system is more fully described in U.S. Pat. No. 3,955,536 and incorporated herein by reference. In a closed waste processing system, a pump and manifold means 16 (shown in FIG. 6) is used to cycle new and a given amount of recycled liquid through the system. Valve 33 controls the volume of liquid through one of the flumes of the platform to continuously or periodically transport the liquid-borne animal excreta to the screening and dewatering apparatus 14 from which it is then transported to a press and other elements of the closed system shown in U.S. Pat. No. 3,955,536. A similar valve 33 may be used for each flume in the platform.

The screening and dewatering apparatus 14 is mounted in the waste collection ditch 13 to extend longitudinally thereof and particularly across the ends of all of flumes 12 of floor 11 of platform 10.

The screening and dewatering apparatus comprises an elongated cylindrical or U-shaped screen 18 which may be at least partially formed of stainless steel tapered bar stock 19 leaving longitudinal openings between the bar stock of approximately 0.005 to 0.060 inches in width. U-shaped flanges 20 are arranged at each end of the U-shaped screen 18 to reinforce the cylindrical configuration. Longitudinal flanges 21 formed along the open U-shaped longitudinal slot 21A formed between the legs of screen 18 aid in reinforcing the structure.

Mounted within screen 18 to extend longitudinally thereof is an auger 22 having a plurality of spiral convolutions or flightings 22A-22H shown in FIG. 2 which are rigidly secured at their spiraling base surfaces 23 to the outside circumferential surfaces of a supporting shaft 24. The outer periphery of some or all of the flightings 22A-22H are provided with brushes 25 which may be, for example, helically-shaped nylon brush structure which rubs on the inside surface of the cylindrical screen 18, as shown in FIG. 2, to aid in keeping open the spacing between the bar stock 19 of the screen for drainage purposes.

The brush structures are adapted to be securely but removably attached to the outer edge of one or more of the flightings 22A-22H in a stainless steel holding channel 26.

It should be noted that the cylindrical screen 18 may be, for example, made in ten foot sections which are connected in end-to-end arrangement running the complete width of the flumed platform 10. The stainless steel cylindrical screen 18 may be, for example, supported every ten feet by a steel frame 27 that holds the screen in a proper position to receive the liquid flume flushing flow on the inside peripheral surface 28 of screen 18 remote from the discharging ends of flumes 12. The screen may be moved laterally in the waste collection ditch 13 to position it in the most advantageous position in relationship to the flush liquid flow trajectory.

The steel mounting frame 27 is mounted on stabilizing support springs 29 to allow a low frequency electric, pneumatic, hydraulic, or other means of vibrator 30 to be attached and operated for vibrating screen 18. This vibrating action aids in keeping the screen spacings open and operative and breaks the surface tension of the liquid in the material mix, thereby preventing the buildup of solid portions of excreta on the screen at any point along its length.

Auger 22 is journaled for rotational movement and is actuated at one end thereof by a hydraulic or electric geared motor (not shown) which rotates the auger at variable speeds determined by the nature and quantity of the solids in the liquid flow received from flumes 12 of platform 10.

The purpose of the brush connected to one or more of the flightings of auger 22 is to continually clean the bar formed cylindrical screen 18 to prevent a binding or fouling of the openings 32 between the spacedly-arranged bar stock 19. As shown in FIG. 4, the bar stock 19 may be tapered to form with space 32 an orifice 34 between juxtapositioned bars to aid in discharging a liquid portion of the excreta and in keeping the spacing between adjacent bars of the screen open. The screen spacing can be made wide for high volume throughput and low recovery of the fibrous material, or it can be made narrow for high recovery of fibrous material and a low volume throughput.

The auger is configured and driven in a fashion such that solids in the liquid plastic material received are forced to move longitudinally of the screen against the opposite side of the trough or waste collection ditch 13 from which flushed water enters. This unique "conveying against the opposite wall" action keeps the collected solids from being continually washed and broken down by their passage underneath each flume flow. This feature is critically important when platform 10 employs twenty to fifty individual flumes 12 and their associated fluid flow.

It should be noted that the unique waste collection ditch 13 and its auger arrangement provides a positive removal and dewatering action of the waste from the collection ditch immediately upon receipt of it from the flumes of platform 10. The dewatering function occurs during the movement of the liquid carrier and its animal excreta content along screen 18 by auger 22. Auger 22 transports the liquid and its excreta content along the inside periphery of screen 18 to thereby provide a dewatering of the solids in the excreta. This dewatering action occurs before the solids in the excreta are exposed to dilution, pumping agitation or microbial degradation, as evident in the prior art when the liquid supported excreta was kept in a sedimentation tank or pond.

The effluent separated by screen 18 from the relatively solid portion of the excreta is moved to a predetermined point of the waste collection ditch 13 where it is delivered via a pump, canal branches and pipelines to a collection pond, as shown in U.S. Pat. No. 3,955,536, with a predetermined amount of the liquid content recirculated back to the upstream ends of flumes 12 of platform 10 to combine with additional liquid such as water for further flushing action of these flumes. The recirculated component of the liquid separated by screen 18 may be combined, if so desired, with a number of chemical additives including, inter alia, hydrochloric and sulfuric acids for the control of its pH factor, its chlorine-ozone condition, and to improve the breakdown of the mucus in the effluent before it reaches screen 18.

The resulting relatively solid mixture emanating from the waste collection screen 18 under the action of auger 22 is transported to a press, as shown in U.S. Pat. No. 3,955,536, which further separates fibrous matter from the liquids.

Thus, it should be noted that a waste processing system, including the transporting, dewatering and treatment of animal waste, is disclosed which is amendable to a high degree of automation through the use of relatively simple equipment requiring a minimum of maintenance and supervision. The use of a flumed animal supporting platform helps to prevent the introduction of sand, soil, stones and other debris which would otherwise have to be removed or allowed to reduce the quality of the processed output.

The dewatering of the solids from liquids of animal excreta before recycling promotes trouble-free irrigation through the elimination of sediment and clogging of pumping, spray orifices and other delivery equipment.

Processing of the liquid portion of animal waste at the time it still contains its maximum amount of valuable organic and inorganic nutrients makes possible the salvaging of said nutrients in quantities heretofore impossible to obtain by prior art methods and permits the stopping of biological action when desired.

For purposes of illustration, a platform 10 may support 15,000 steers having an average weight of 800 pounds, each excreting about 8 percent of its weight per day, which waste is approximately 85 percent water.

Approximately 3,320 gallons per minute (G.P.M.) of waste is generated and pumped out of pen 10 for the 15,000 steers to waste collection ditch 13. As heretofore described, the solids from the screen are passed to the press with the liquids from both the screen and the press moved into a suitable pond, if so desired, and recirculated for concentration purposes. Liquid from these ponds may be pumped back to pen 10 for moving new waste through its slotted or teardrop panel floor configuration.

Although the system disclosed has been described for animal confinement pens, it may be used in any form of material dewatering system.

It should be noted that each of the auger flightings holds back a predetermined amount of the liquid, thereby preventing overrun of the screen and uncontrolled movement of the liquid and its water content along and over the edges of the screen. Further, the flightings and the brushes along their edges mechanically move the solid content captured by the screen along the screen surface to the end thereof. This action prevents a buildup of the solid portion of the excreta on various portions of the screen which otherwise would plug the screen and effect the vibrating action of the screen due to the dampening effect of the solid product.

Another desirable feature of the disclosed apparatus is the fact that the waste liquid leaving the flumes strikes the screen surface with the force of the pumping action of the system, but also with the accumulated effect of gravity, as shown in FIG. 1. This feature helps drive the water through the opening in the screen to more effectively dewater the material being handled.

While the principles of the invention have now been made clear in an illustrative embodiment, there will be immediately obvious to those skilled in the art many modifications of structure, arrangement, proportions, elements, materials and parts used in the practice of the invention, and otherwise, which are particularly adapted for specific environments without departing from these principles. The appended claims are, therefore, intended to cover and embrace any such modifications within the limits only of the true spirit and scope of the invention.

What is claimed is:

1. Apparatus for transporting and dewatering a liquid-solid material mixture comprising:
    an elongated screen in the shape of a trough,
    an auger comprising a plurality of flightings journaled for rotation in said trough with the flightings of said auger providing a positive pitch along the length of said trough,
    said screen comprising a U-shaped configuration mounted to closely surround said flightings and receiving therewithin, and over at least a part of, said flightings at points along its length the material mixture,
    said flightings having outside edges that upon rotation of said auger move over the inside periphery of said screen, and
    brush means detachably mounted on the edges of said flightings for brushing over perforations in said screen to aid in keeping them open for draining liquid from the material mixture,
    said screen being formed of stainless steel bars spacedly arranged in a direction longitudinal of said auger with the edges of said bars forming the outer periphery of said screen being tapered toward each other to provide an orifice between juxtapositioned bars of between 0.005 and 0.060 inches in width, and a frame, spring means for resiliently mounting said frame in a ditch, means for mounting said trough on said frame, and a vibratory means connected to said frame for vibrating said screen to aid in keeping the openings therein clear of the separate portions of the material mixture.

* * * * *